(12) United States Patent
Van Garderen

(10) Patent No.: US 11,991,964 B2
(45) Date of Patent: May 28, 2024

(54) PLANT GROWTH AND SUPPORT MODULE

(71) Applicant: Sempergreen Vertical Systems Holding BV, Odijk (NL)

(72) Inventor: Corne Van Garderen, Odijk (NL)

(73) Assignee: Sempergreen Vertical Systems Holding BV, Odijk (NL)

( * ) Notice: Subject to any disclaimer, the term of this patent is extended or adjusted under 35 U.S.C. 154(b) by 49 days.

(21) Appl. No.: 18/012,172

(22) PCT Filed: Jun. 29, 2021

(86) PCT No.: PCT/EP2021/067829
§ 371 (c)(1),
(2) Date: Dec. 21, 2022

(87) PCT Pub. No.: WO2022/002927
PCT Pub. Date: Jan. 6, 2022

(65) Prior Publication Data
US 2023/0232751 A1    Jul. 27, 2023

(30) Foreign Application Priority Data

Jun. 29, 2020 (NL) ........................... 2025937

(51) Int. Cl.
*A01G 9/02* (2018.01)
*A01G 24/00* (2018.01)
(Continued)

(52) U.S. Cl.
CPC ............. *A01G 9/025* (2013.01); *A01G 27/04* (2013.01); *A01G 31/00* (2013.01)

(58) Field of Classification Search
CPC ........ A01G 9/025; A01G 24/44; A01G 24/00; A01G 24/10; A01G 24/18; A01G 24/30; A01G 24/35
See application file for complete search history.

(56) References Cited

U.S. PATENT DOCUMENTS 3,524,279 A * 8/1970 James ............... A01G 9/0295
                                                47/87
3,755,964 A * 9/1973 Rack ................ A01G 9/0295
                                               428/117
(Continued)

FOREIGN PATENT DOCUMENTS

| CA | 2771773 A1 | 4/2010 |
| EP | 1243703 A1 * | 9/2002 ............. A01G 1/005 |
| WO | 2017146628 A1 | 8/2017 |

OTHER PUBLICATIONS

EP1243703 translation, Dume et al, retrieved from EPO Mar. 30, 2024 (Year: 2002).*

(Continued)

*Primary Examiner* — Kristen C Hayes
(74) *Attorney, Agent, or Firm* — Hodgson Russ LLP

(57) ABSTRACT

The current invention relates to a plant growth and support module comprising (a) a backing (1), (b) a hydroponic substrate (8), wherein said hydroponic substrate (8) comprises an array of holes (9) for receiving a plant and/or a growth medium, (c) an irrigation layer, wherein said irrigation layer comprises a capillary material, and (d) a front (2), wherein said front (2) is connected to said backing (1), enclosing the hydroponic substrate (8) and the irrigation layer, said front (2) comprising an array of openings (4), said array of openings (4) are aligned with the holes of the hydroponic substrate (8), and wherein both the backing (1) and the front (2) comprise glass fibers, and which backing (1) and said front (2) are interconnected by means of an infusible stitching (3). Further aspects of the invention relate to a kit of at least two plant growth and support modules, a green wall, and a method of manufacturing a green wall.

19 Claims, 4 Drawing Sheets

(51) Int. Cl.
*A01G 24/44* (2018.01)
*A01G 27/04* (2006.01)
*A01G 31/00* (2018.01)

(56) References Cited

U.S. PATENT DOCUMENTS 4,777,763 A * 10/1988 Shannon ................ A01G 24/18
47/87
2011/0093122 A1 4/2011 Koumoudis

OTHER PUBLICATIONS

WIPO, International Search Report for PCT/EP2021/067829, Aug. 24, 2021.

* cited by examiner

PLANT GROWTH AND SUPPORT MODULE

FIELD OF THE INVENTION

The invention pertains to the technical field of plant growth and support systems.

In particular, the invention relates to a plant growth and support module suitable for green or ecological walls.

BACKGROUND

Plant support systems for green roofs and walls, also known as planted roofs, roof gardens, planted walls, wall gardens or vertical gardens, are well-known in the art. All of these systems have a common purpose, i.e. providing a plurality of layers which allow plants to efficiently grow, while keeping them organized and well-supported on a variety of surfaces.

Particular difficulty arises when one aims to grow and support plants on vertical surfaces, especially regarding water management and soil retention. CA 2 771 773 therefore describes a panel for modular support for plants in a vertical orientation, wherein an enclosed structure is provided with good water management and soil retention. Said structure comprises a backing of a thermoplastic olefin, and a front cover consisting of polypropylene felt, wherein a hydroponic substrate is provided. The structures of CA '773 thus allows for a good plant growing environment, which is substantially light in order to be coupled to a vertical surface. Similar structures are known in the art.

In recent years, governmental regulations and requirements of project developers, municipalities and other stakeholders are becoming increasingly strict, one of those requirements concerning fire safety. As such, also plant support systems for roofs and walls need ideally to comply with these stringent regulations. However, plant support systems as presently known in the art commonly comprise a multitude of flammable and/or fusible materials, which is a major disadvantage.

Accordingly, there remains a need in the art for an improved plant support system which complies with these stringent fire safety requirements, while still maintaining a reasonably light structure suitable for coupling to a vertical surface, and which allows for optimal plant growing conditions.

The present invention aims to resolve at least some of the problems and disadvantages mentioned above.

SUMMARY OF THE INVENTION

The present invention and embodiments thereof serve to provide a solution to one or more of above-mentioned disadvantages. To this end, the present invention relates to plant growth and support module according to claim 1. The plant growth and support module as herein described complies with stringent fire safety requirements, and provides for a light structure with optimal plant growing conditions.

In particular the present invention is defined by the following, not limitative embodiments:

1. A plant growth and support module comprising:
   a. a backing,
   b. a hydroponic substrate, wherein said hydroponic substrate comprises an array of holes for receiving a plant and/or a growth medium,
   c. an irrigation layer, wherein said irrigation layer comprises a capillary material, and
   d. a front, wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and which backing and said front are interconnected by means of an infusible stitching.

2. The plant growth and support module according to embodiment 1, wherein said glass fibers are alumino-borosilicate glass fibers.

3. The plant growth and support module according to embodiment 1 or 2, wherein said infusible stitching comprises aromatic polyamide fibers chosen from the group of meta-aramids, para-aramids, or combinations thereof.

4. The plant growth and support module according to any of the embodimentsl-3, wherein said infusible stitching comprises metallic wire strands, preferably steel or stainless steel wire strands.

5. The plant growth and support module according to embodiment 4, wherein said infusible stitching consists of para-aramid fibers and metallic wire strands, said infusible stitching having a Tex number of between 150 and 300.

6. The plant growth and support module according to any of the embodiments 1-5, wherein said backing and said front consist of a woven fabric, said woven fabric comprising the glass fibers.

7. The plant growth and support module according to embodiment 6, wherein the woven fabric of said backing comprises metallic wire, preferably stainless steel wire.

8. The plant growth and support module according to any of the embodiments 1-7, wherein the glass fibers have a thickness of between 5 and 15 μm.

9. The plant growth and support module according to embodiment 7 or 8, wherein the metallic wire has a thickness of between 5 and 15 μm.

10. The plant growth and support module according to any of the embodiments 1-9, wherein said hydroponic substrate comprises a mineral wool material selected from the group of alkaline earth silicate (AES) wool, aluminosilicate wool (ASW) wool, polycrystalline wool (PCW), kaowool, or combinations thereof.

11. The plant growth and support module according to embodiment 10, wherein the mineral wool material is a pressed material, and has a density of between 60 and 100 kg/m$^3$.

12. The plant growth and support module according to any of the embodiments 1-11, wherein said capillary material consists of a synthetic non-woven textile, said non-woven textile having an absorption capacity of between 0.8 and 1.5 L/m$^2$.

13. The plant growth and support module according to any of the embodiments 1-12, wherein the front, the irrigation layer and the hydroponic substrate are positioned off-center in relation to the backing, thereby providing two or more consecutive extended edges, said edges providing for an overlapping zone.

14. The plant growth and support module according to any of the embodiments 1-13, wherein said module comprises at least one sensor capable of measuring a variable selected from the group of moisture content, fertilization level, growth rate, or combinations thereof.

15. The plant growth and support module according to any of the embodiments 1-14, wherein said module comprises a plurality of plants, which plants are pre-grown in a plant nursery.

16. A kit of at least two plant growth and support modules according to any of the embodiments 1-15.

17. A green wall comprising at least two plant growth and support modules according to any of the embodiments 1-15, wherein the backing of said plant growth and support modules are fixed to a wall surface.

18. A method of manufacturing a green wall, comprising the steps of:
   a. providing at least two plant growth and support modules, each of said modules comprising (i) a backing, (ii) a hydroponic substrate, wherein said hydroponic substrate comprises an array of holes for receiving a plant and/or a growth medium, (iii) an irrigation layer, wherein said irrigation layer comprises a capillary material, and (iv) a front, wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and are interconnected by means of an infusible stitching;
   b. pre-growing a plurality of plants in the holes of the hydroponic substrate;
   c. assembling the plant growth and support modules into a green wall by fixing the backing of said plant growth and support modules to a wall surface.

19. The method according to embodiment 18, wherein said plant growth and support modules are modules according to any of the embodiments 1-15.

FIGURES

FIG. 1 shows a perspective view of a plant growth and support module according to a preferred embodiment of the invention.

FIG. 2 shows a front view of a plant growth and support module according to a preferred embodiment of the invention.

FIG. 3 shows a front view of a green wall according to a preferred embodiment of the invention.

FIG. 4 shows a perspective view of a hydroponic substrate according to a preferred embodiment of the invention.

DETAILED DESCRIPTION OF THE INVENTION

The present invention concerns a plant growth and support module with improved fire resistance characteristics, therefore complying with stringent fire safety requirements, especially those regarding green walls, while maintaining a reasonably light structure and allowing optimal plant growing conditions.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a fiber" refers to one or more than one fiber.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments.

In a first aspect, the present invention relates to a plant growth and support module comprising (a) a backing, (b) a hydroponic substrate, wherein said hydroponic substrate comprises an array of holes for receiving a plant and/or a growth medium, (c) an irrigation layer, wherein said irrigation layer comprises a capillary material, and (d) a front, wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and which backing and said front are interconnected by means of an infusible stitching.

The term "plant growth and support module" refers to any physical structure providing to a plant both an environment which is beneficial for its growth, and a means of structural support for the plant. Plant growth and support modules as described herein are specifically suitable for creating green walls and/or roofs, providing a plurality of layers which allow plants to efficiently grow, while keeping them organized and well-supported on a variety of surfaces. Plant growth and support modules as described herein are especially suitable in a mainly vertical orientation.

The wording "backing" relates to the back layer of the plant growth and support module, which is intended to be oriented towards the intended surface, e.g. towards the wall and/or roof.

The term "hydroponic substrate" refers to a plant growth substrate that does not comprise soil, but instead comprises an inert medium such as perlite, rockwool, clay pellets, peat moss, or vermiculite. The basic premise behind a hydroponic substrate is to allow the plant roots to come in direct contact with a nutrient solution or water, while also having access to oxygen, which are both essential for proper growth. Furthermore, growing plants in a hydroponic substrate provides for a faster and more efficient growth of the plants, by allowing the careful control of nutrient availability and pH level. A hydroponic system will also use less water than soil based plants because the system is enclosed, which results in less evaporation.

The wording "irrigation layer" relates to a layer which allows the nutrient solution or water to be evenly distributed over the plant growth and support module, thereby equally contacting the root system of every individual plant with the nutrient solution or water.

"Glass fiber" is the product formed by extruding thin strands of silica-based or other glass into individual fibers. The most common types of glass fiber include E-glass, which is an alumino-borosilicate glass, typically with less than 1% (w/w) alkali oxides, A-glass (alkali-lime glass with low boron oxide content), E-CR-glass (electrical/chemical resistance), alumino-lime silicate glass, typically with less than 1% (w/w) alkali oxides, C-glass (alkali-lime glass with high boron oxide content), D-glass (borosilicate glass), R-glass (alumino-silicate glass without MgO and CaO), and S-glass (alumino-silicate glass without CaO, but with high MgO content).

By preference, the glass fibers are alumino-borosilicate glass fibers.

The term "infusible stitching" relates to any stitching or yarn which has a high resistance to melting and/or fusing. More in particular, "stitching" refers to the specific state wherein a yarn is configured to assemble one or more individual elements. According to the present invention, the stitching thus assembles the front and backing into a closed configuration, enclosing the hydroponic substrate and the irrigation layer.

The plant growth and support module according to the present invention has the advantage that it has improved fire resistance characteristics, thereby preventing and/or retarding the passage of excessive heat, hot gasses and/or flames. The module as described herein therefore able to comply with recent, stringent fire safety requirements, especially those regarding green walls, while still maintaining a reasonably light structure suitable for coupling to a vertical surface, and which allows for optimal plant growing conditions.

In particular, the glass fibers comprised in the backing and the front of the plant growth and support module are highly resistant to fire and/or heat, and thus limit the transfer of fire and/or heat from a burning environment towards the roof or wall to which it is mounted. It is however crucial that the plant growth and support module remains largely intact in case of a fire, in order to maintain its fire/heat resistance. The infusible stitching interconnecting the backing and the front allows a strong connection that is able to withstand fire and/or heat and thus keeps the module largely intact.

It is clear from the description that the dimensions of the array of holes of the hydroponic substrate and of the array of openings of the front can be varied in view of the intended result. As such, the array of holes and the array of openings can for example have dimensions of 1×2, 1×3, 1×4, 1×5, 1×6, of 2×2 to 2×6, of 3×3 to 3×6, of 4×4 to 4×6, of 5×5 or 5×6, of 6×6, or even larger dimensions like 10×10 or 15×15 holes or openings.

By preference, said infusible stitching comprises aromatic polyamide fibers chosen from the group of meta-aramids, para-aramids, or combinations thereof.

"Aromatic polyamide fibers", also referred to as "aramid fibers", are a class of heat-resistant and strong synthetic fibers. They are mainly known from aerospace and military applications, for ballistic-rated body armor fabric and ballistic composites, in marine cordage, marine hull reinforcement, and as an asbestos substitute. The chain molecules in the fibers are highly oriented along the fiber axis. As a result, a higher proportion of the chemical bond contributes to fiber strength than in many other synthetic fibers.

Aramids or aromatic polyamides are characterized by a high melting point, thus enabling a high heat resistance, allowing the plant growth and support module to remain intact in case of fires. According to some embodiments, the polyamide fibers have a melting point of above 250° C., preferably above 300° C., above 350° C., above 400° C., above 450° C., more preferably above 500° C.

Furthermore, aramids or aromatic polyamides show a good resistance to abrasion, have a low flammability, and have an outstanding strength-to-weight ratio.

According to a further or another embodiment, said infusible stitching comprises metallic wire strands. Said metallic wire strands strengthen the infusible stitching, thereby allowing the support of a large amount, i.e. a large weight, of plant material. Metallic wire strands are very resistant to fire and/or heat, and therefore allow a strong connection that is able to withstand fire and/or heat and thus keeps the module largely intact.

By preference, said infusible stitching comprise steel or stainless steel wire strands, more by preference stainless steel wire strands.

In some embodiments, said infusible stitching consists of para-aramid fibers and metallic wire strands, said infusible stitching having a Tex number of between 150 and 300. Herein, para-aramid fibers and metallic wire strands are combined, which further improves the resistance to fire and/or heat and allows the support of a substantially large amount, i.e. a substantially large weight, of plant material.

The term "Tex" relates to the so-called Tex standard, which was adopted by the International Organization for Standardization (ISO) as a preferred method of consistent thread measurement. Tex is an accurate measurement and is considered a direct numbering system, meaning the higher the Tex number, the heavier the thread. The Tex standard uses 1000 meters of thread per gram as a reference point, meaning that if 1000 meters of thread weighs 25 grams, it has a Tex number of 25.

By preference, the infusible stitching has a Tex number of between 160 and 290, between 170 and 280, between 180 and 270, between 190 and 260, more by preference of between 200 and 250.

According to a further or another embodiment, said backing and said front consist of a woven fabric, wherein said woven fabric comprises the glass fibers.

"Non-woven" fabric is a fabric-like material made from fibers bonded together by chemical, mechanical, heat or solvent treatment. The term is used in the textile manufacturing industry to denote fabrics, such as felt, which are neither woven nor knitted. "Woven" fabric is a fabric that is formed weaving, i.e. by interlacing two or more threads to one another, said threads are called "warp threads" and "weft threads".

The woven fabric comprising glass fibers according to the present invention has outstanding fire and/or heat resistance characteristics, while providing adequate support for plants to the plant growth and support module. In some embodiments, the woven fabric consists of warp threads and weft threads, both comprising the glass fibers.

In some embodiments, the woven fabric of said backing comprises metallic wire. The backing being suitable for connecting the plant growth and support modules to a surface, the metallic wire allows for strengthening the backing structure, thus improving the connection thereof to a surface, e.g. a roof or wall. By preference, the woven fabric of said backing comprises stainless steel wire.

According to an embodiment, the backing comprises, instead of a metallic wire, a combination of a woven cross like figure stitched on a thicker material comprising of glass fibers. Said material can be similar to the material at the front but has a weight of 1.0-1.2 kg/m². The strengthening provided by said combination is similar compared to the strengthening provided by an embodiment comprising a metallic wire.

The glass fibers according to some embodiments, have a thickness of between 5 and 15 μm. Within said thickness range, the front and backing are substantially thin in order to provide for a compact plant growth and support module, while still providing adequate structure, stability, as well as fire and/or heat resistance. By preference, the glass fibers have a thickness of between 6 and 14 μm, between 7 and 13 μm, between 8 and 12 μm, between 8 and 11 μm, more by preference between 8 and 10 μm.

According to some embodiments, the metallic wire has a thickness of between 5 and 15 μm. Within said thickness range, the backing is substantially thin in order to provide for a compact plant growth and support module, while still providing adequate structure, stability, as well as fire and/or heat resistance. In particular, a strong backing structure is obtained by employment of metallic wires with a thickness within the described range. By preference, the metallic wire has a thickness of between 6 and 14 μm, between 7 and 13 μm, between 8 and 12 μm, between 9 and 12 μm, more by preference between 9 and 11 μm.

The hydroponic substrate as described herein, according to some embodiments, comprises a mineral wool material selected from the group of alkaline earth silicate (AES) wool, aluminosilicate wool (ASW) wool, polycrystalline wool (PCW), kaowool, or combinations thereof. The hydroponic substrate allows the plant roots to come in direct contact with a nutrient solution or water, while also having access to oxygen, which are both essential for proper growth. The hydroponic substrates as described herein furthermore have excellent heat and/or fire resistance characteristics thereby contributing to the general purpose of the invention.

By preference, the mineral wool material is a pressed material, and has a density of between 60 and 100 kg/m³. This allows for a light and compact plant growth and support module, while achieving optimal contact between the nutrient solution or water and the plant roots. By preference the mineral wool material has a density of between 65 and 95 kg/m³, between 70 and 90 kg/m³, more be preference between 75 and 85 kg/m³.

The capillary material as described herein, according to some embodiments, consists of a synthetic non-woven textile, said non-woven textile having an absorption capacity of between 0.8 and 1.5 L/m². Within this range, nutrient solution or water is evenly distributed, therefore enabling optimal growth of plants. By preference, the absorption capacity of the non-woven textile is comprised between 0.9 and 1.4 L/m², between 1.0 and 1.3 L/m², more by preference between 1.0 and 1.2 L/m².

According to a further or another embodiment, the front, the irrigation layer and the hydroponic substrate are positioned off-center in relation to the backing, thereby providing two or more consecutive extended edges, said edges providing for an overlapping zone.

In some embodiments, the backing comprises one or more spacing and/or fastening means. "Spacing means" or "fastening means" as described herein, relate to any means for spacing or fastening the plant growth and support module to a suitable surface. As such, these means possibly comprise screws, bolts, nails, clamps, adhesive protrusions, similar means, or combinations thereof. In some embodiments, the plant growth and support module is fastened directly on a suitable surface. In some embodiments said spacing and/or fastening means protrude at least 2 mm from said backing, thereby allowing air to pass freely, in support of an optimal plant growth environment. By preference, said spacing and/or fastening means protrude at least 3 mm, at least 4 mm, at least 5 mm, at least 10 mm, at least 20 mm, more by preference at least 50 mm from said backing.

According to a further or another embodiment, said plant growth and support module comprises at least one sensor capable of measuring a variable selected from the group of moisture content, fertilization level, growth rate, or combinations thereof. The plant growth and support module as described herein thus provides for a means of monitoring any of said variables in the module itself, or by extension in a plurality of modules. More specifically, a plurality of modules could be combined in a group, wherein only one of said modules comprises a sensor, and wherein said sensor monitors any of said variables in all of the modules comprised within said group. The number of sensors present in such a group of modules can be varied in function of the size of the group.

In some embodiments, said plant growth and support module comprises a plurality of plants, which plants are pre-grown in a plant nursery. Pre-growing plants in the plant growth and support modules according to the invention allows for homogeneous green walls or green roofs, wherein the plants provide an optimal coverage of the wall or roof surface, and wherein they remain in good health for a longer time. By preference, said plants are pre-grown in a plant nursery until at least 50% occupancy of the available plant volume in the plant growth and support module is achieved. More by preference, said plants are pre-grown in a plant nursery until at least 60%, at least 70%, at least 80%, most by preference at least 90% occupancy of the available plant volume in the plant growth and support module is achieved.

A second aspect of the present invention relates to a kit of at least two plant growth and support modules according to any of the embodiments described herein. The kit allows the manufacture of a green wall or roof, wherein said plant growth or support modules are connected to a suitable surface, and wherein modules can be freely combined to follow specific shapes of the surface to which they are connected. All advantages as discussed in light of individual plant growth and support modules thus also apply to the kit at least two of said modules. As such, the kit allows for the manufacture of a green wall or roof, wherein optimal heat and/or fire resistance characteristics are obtained.

A third aspect of the present invention provides for a green wall comprising at least two plant growth and support modules according to any of the embodiments described herein, wherein the backing of said plant growth and support modules are fixed to a wall surface. All advantages as discussed in light of individual plant growth and support modules thus also apply to the assembled green wall, obtaining optimal heat and/or fire resistance characteristics.

A fourth aspect of the present invention concerns a method of manufacturing a green wall, comprising the steps of:

a. providing at least two plant growth and support modules, each of said modules comprising (i) a backing, (ii) a hydroponic substrate, wherein said hydroponic substrate comprises an array of holes for receiving a plant and/or a growth medium, (iii) an irrigation layer, wherein said irrigation layer comprises a capillary material, and (iv) a front, wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and are interconnected by means of an infusible stitching;

b. pre-growing a plurality of plants in the holes of the hydroponic substrate;

c. assembling the plant growth and support modules into a green wall by fixing the backing of said plant growth and support modules to a wall surface.

The method according to the present invention has the advantage that a green wall is obtained with vastly improved heat and/or fire resistance characteristics, thereby preventing and/or retarding the passage of excessive heat, hot gasses and/or flames. The method as such allows the manufacture of a green wall which complies with recent, stringent fire safety requirements, while still maintaining a reasonably light structure, whereby the wall surface is not too heavily loaded. The resulting green wall meanwhile allows for optimal plant growing conditions and thus has a long life-span.

In particular, the glass fibers comprised in the backing and the front of the plant growth and support module are highly resistant to fire and/or heat, and thus limit the transfer of fire and/or heat from a burning environment towards the wall to which it is mounted. It is however crucial that the plant growth and support module remains largely intact in case of a fire, in order to maintain its fire/heat resistance. The infusible stitching interconnecting the backing and the front allows a strong connection that is able to withstand fire and/or heat and thus keeps the module largely intact.

By preference, said plant growth and support modules relate to modules according to any of the embodiments of the first aspect as described herein. All advantages therein described thus also apply to the method according to the present invention.

DESCRIPTION OF FIGURES

The invention is further described by the following figures which illustrate the invention, and are not intended to, nor should they be interpreted to, limit the scope of the invention.

Figure 1:
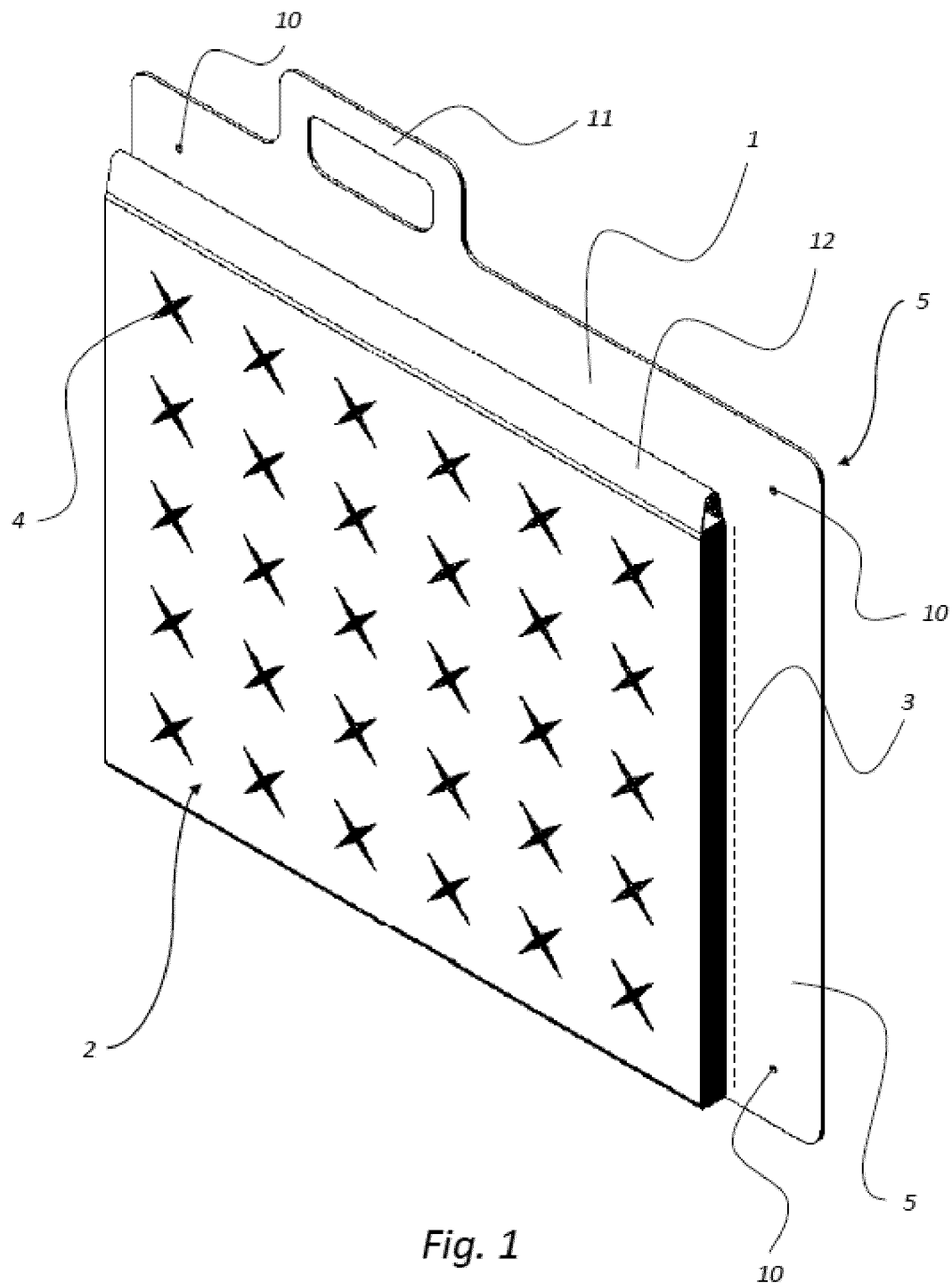
FIG. 1 shows a perspective view of a plant growth and support module according to a preferred embodiment of the invention. The plant growth and support module comprises a backing 1, and a front 2, which backing 1 and which front 2 are interconnected by means of an infusible stitching 3. The infusible stitching preferably consists of para-aramid fibers (although other aromatic polyamides are suitable as well), and metallic wire strands, said infusible stitching having a Tex number of between 200 and 250. Herein, para-aramid fibers and metallic wire strands are combined, which improves the resistance to fire and/or heat and allows the support of a substantially large amount, i.e. a substantially large weight, of plant material.

Enclosed by the backing 1 and the front 2 are a hydroponic substrate, wherein said hydroponic substrate comprises an array of holes for receiving a plant and/or a growth medium, and an irrigation layer, wherein said irrigation layer comprises a capillary material. The front 2 comprises an array of 6×5 openings 4, said array of openings 4 are aligned with the holes of the hydroponic substrate. Both the backing 1 and the front 2 comprise alumino-borosilicate glass fibers. The plant growth and support module shown herein has the advantage that it has improved fire resistance characteristics, thereby preventing and/or retarding the passage of excessive heat, hot gasses and/or flames. The module as described herein therefore able to comply with recent, stringent fire safety requirements, while still maintaining a reasonably light structure suitable for coupling to a vertical surface, and which allows for optimal plant growing conditions. The plant growth and support module is configured so, that the front 2, the irrigation layer and the hydroponic substrate (internal) are positioned off-center in relation to the backing 1, thereby providing two or more consecutive extended edges 5, said edges providing for an overlapping zone in case of combining multiple modules. The plant growth and support module shown herein comprises fastening means 10, for the coupling of the module to a wall by means of screws. For ease of handling, the plant growth and support module further comprises a handle 11. As illustrated, the plant growth and support module can be optionally provided with an irrigation canal 12 to further improve water supply to the irrigation layer located inside the module.

Figure 2:
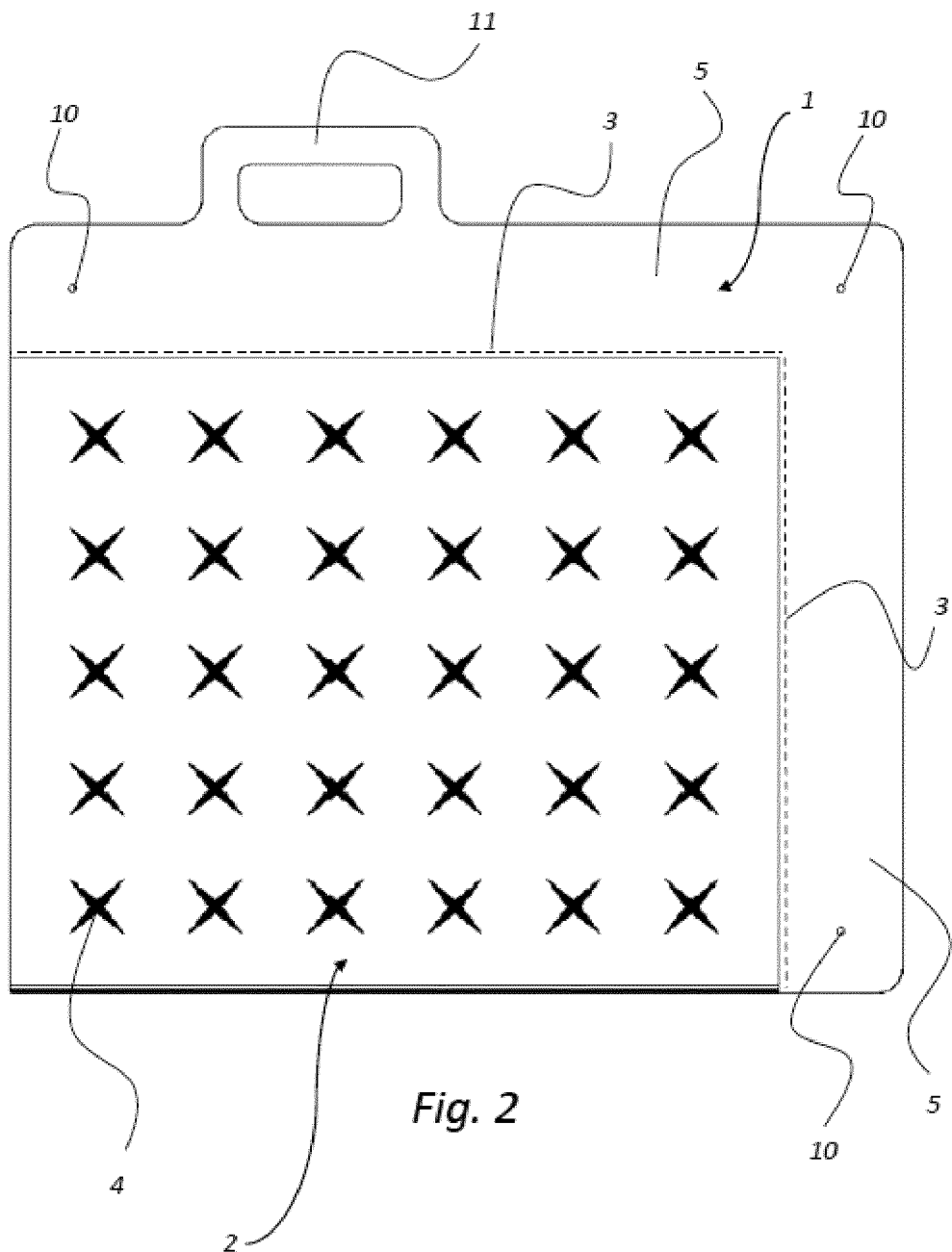

FIG. 2 shows a front view of a plant growth and support module according to a preferred embodiment of the invention, encompassing the backing 1, the front 2, the infusible stitching 3, the array of 6×5 openings 4, and the consecutive extended edges 5 as discussed above. The array of openings 4 of the front 2 is ideally suited for plants to grow through, in which case said plants are internally in contact with the hydroponic substrate and the irrigation layer. The backing 1 and front 2 consist of a woven fabric comprising alumino-borosilicate glass fibers, which yields outstanding fire and/or heat resistance characteristics, while providing adequate support for plants to the plant growth and support module. The woven fabric of the backing 1 further comprises metallic wire. The backing being suitable for connecting the plant growth and support modules to a surface by means of the fastening means 10, the metallic wire allows for strengthening the backing structure, thus improving the connection thereof to a surface, e.g. a roof or wall.

Figure 3:
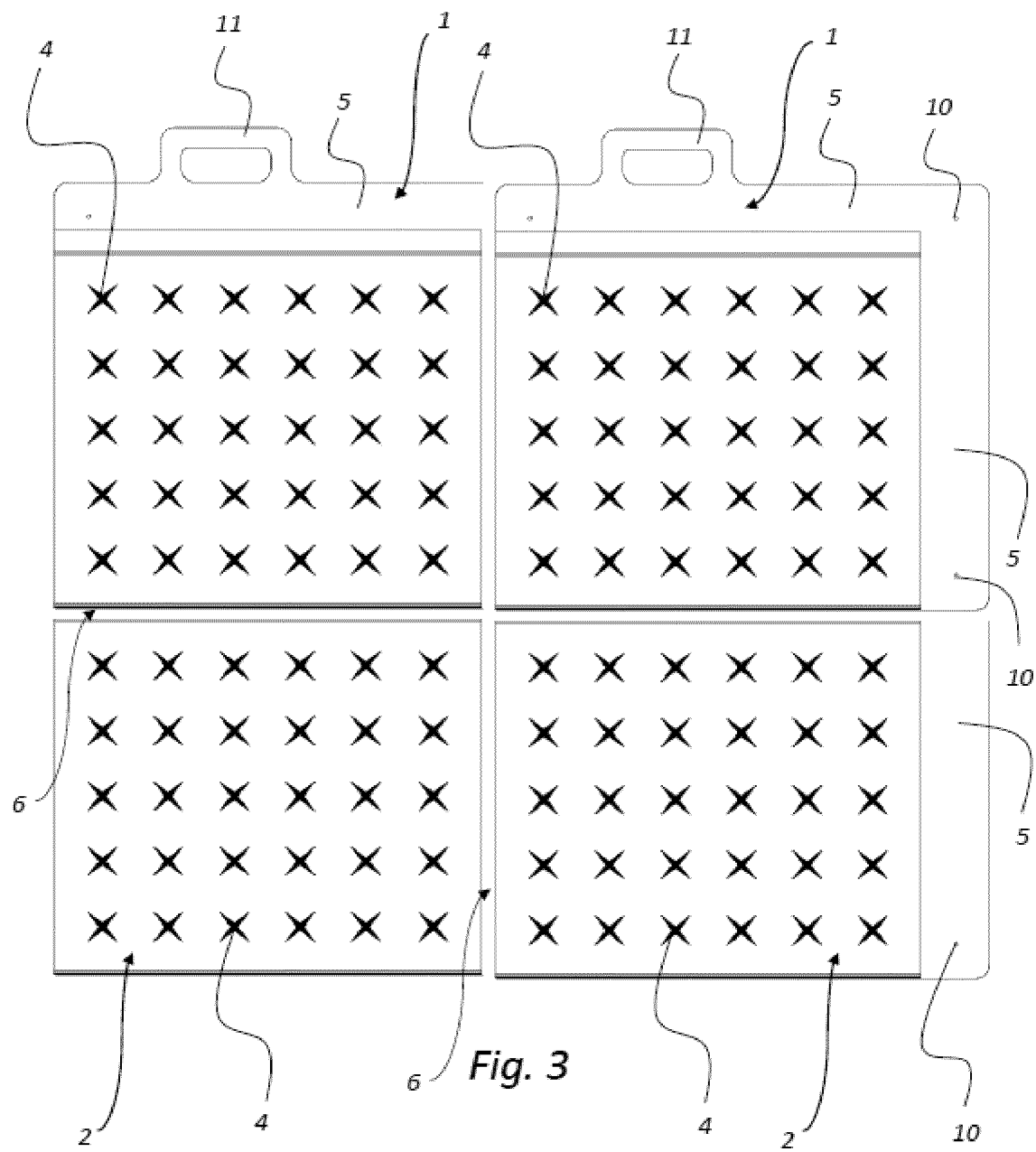

FIG. 3 shows a front view of a green wall comprising 4 plant growth and support modules, each comprising a backing 1, a front 2, which backing 1 and which front 2 are interconnected by means of an infusible stitching. Enclosed by the backing 1 and the front 2 are a hydroponic substrate, wherein said hydroponic substrate comprises an array of holes for receiving a plant and/or a growth medium, and an irrigation layer, wherein said irrigation layer comprises a capillary material. The front 2 comprises an array of 6×5 openings 4, said array of openings 4 are aligned with the holes of the hydroponic substrate. The plant growth and support modules are configured so, that the front 2, the irrigation layer and the hydroponic substrate (internal) are positioned off-center in relation to the backing 1, thereby providing two or more consecutive extended edges 5, said edges providing for an overlapping zone 6 between the plurality of modules. The plant growth and support modules shown herein comprise fastening means 10, for the coupling of the module to a wall by means of screws. For ease of handling, the plant growth and support modules further comprise a handle 11.

Figure 4:
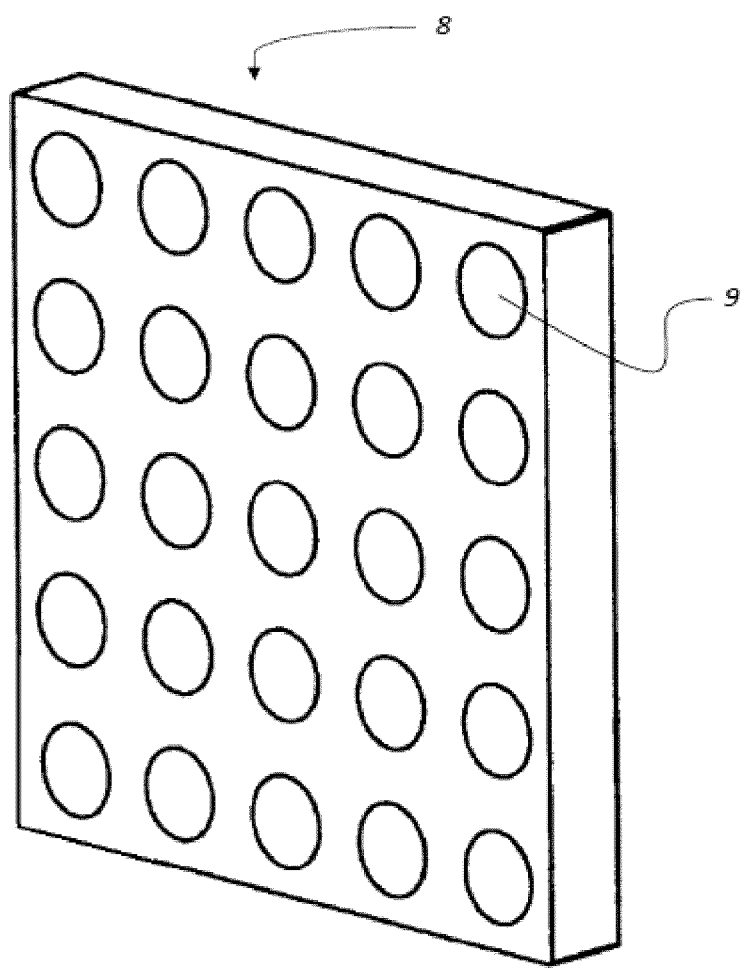

FIG. 4 shows a perspective view of a hydroponic substrate 8, wherein said hydroponic substrate 8 comprises an array of 5×5 holes 9 for receiving a plant and/or a growth medium. The hydroponic substrate comprises a pressed mineral wool material and allows the plant roots to come in direct contact with a nutrient solution or water, while also having access to oxygen, which are both essential for proper growth. The hydroponic substrates as described herein furthermore have excellent heat and/or fire resistance characteristics thereby contributing to the general purpose of the invention. The pressed material has a density of between 75 and 85 kg/m$^3$. This allows for a light and compact plant growth and support module, while achieving optimal contact between the nutrient solution or water and the plant roots.

LIST OF NUMBERED ITEMS 1 backing
2 front
3 infusible stitching
4 openings
5 consecutive extended edges
6 overlapping zone
8 hydroponic substrate
9 holes of the hydroponic substrate
10 fastening means
11 handle
12 irrigation canal

The invention claimed is:

1. A plant growth and support module comprising:
   a. a backing,
   b. a hydroponic substrate, wherein said hydroponic substrate comprises an array of holes for receiving a plant and/or a growth medium,
   c. an irrigation layer, wherein said irrigation layer comprises a capillary material, and
   d. a front,
   wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and which backing and said front are interconnected by means of an infusible stitching.

2. The plant growth and support module according to claim 1, wherein said glass fibers are alumino-borosilicate glass fibers.

3. The plant growth and support module according to claim 1, wherein said infusible stitching comprises aromatic polyamide fibers chosen from the group of meta-aramids, para-aramids, or combinations thereof.

4. The plant growth and support module according to claim 1, wherein said infusible stitching comprises metallic wire strands, preferably steel or stainless steel wire strands.

5. The plant growth and support module according to claim 4, wherein said infusible stitching consists of para-aramid fibers and metallic wire strands, said infusible stitching having a Tex number of between 150 and 300.

6. The plant growth and support module according to claim 1, wherein said backing and said front consist of a woven fabric, said woven fabric comprising the glass fibers.

7. The plant growth and support module according to claim 6, wherein the woven fabric of said backing comprises metallic wire, preferably stainless steel wire.

8. The plant growth and support module according to claim 1, wherein the glass fibers have a thickness of between 5 and 15 μm.

9. The plant growth and support module according to claim 7, wherein the metallic wire has a thickness of between 5 and 15 μm.

10. The plant growth and support module according to claim 1, wherein said hydroponic substrate comprises a mineral wool material selected from the group of alkaline earth silicate (AES) wool, aluminosilicate wool (ASW) wool, polycrystalline wool (PCW), kaowool, or combinations thereof.

11. The plant growth and support module according to claim 10, wherein the mineral wool material is a pressed material, and has a density of between 60 and 100 kg/m$^3$.

12. The plant growth and support module according to claim 1, wherein said capillary material consists of a synthetic non-woven textile, said non-woven textile having an absorption capacity of between 0,8 and 1,5 L/m$^2$.

13. The plant growth and support module according to claim 1, wherein the front, the irrigation layer and the hydroponic substrate are positioned off-center in relation to the backing, thereby providing two or more consecutive extended edges, said edges providing for an overlapping zone.

14. The plant growth and support module according to claim 1, wherein said module comprises at least one sensor capable of measuring a variable selected from the group of moisture content, fertilization level, growth rate, or combinations thereof.

15. The plant growth and support module according to claim 1, wherein said module comprises a plurality of plants, which plants are pre-grown in a plant nursery.

16. A kit of at least two plant growth and support modules according to claim 1.

17. A green wall comprising at least two plant growth and support modules according to claim 1, wherein the backing of said plant growth and support modules are fixed to a wall surface.

18. A method of manufacturing a green wall, comprising the steps of:
   a. providing at least two plant growth and support modules, each of said modules comprising (i) a backing, (ii) a hydroponic substrate, wherein said hydroponic substrate comprises an array of holes for receiving a plant and/or a growth medium, (iii) an irrigation layer, wherein said irrigation layer comprises a capillary material, and (iv) a front, wherein said front is connected to said backing, enclosing the hydroponic substrate and the irrigation layer, said front comprising an array of openings, said array of openings are aligned with the holes of the hydroponic substrate, and wherein both the backing and the front comprise glass fibers chosen from the group of alumino-borosilicate glass fibers, alkali-lime glass fibers, alumino-lime silicate glass fibers, borosilicate glass fibers, alumino-silicate glass fibers, or combinations thereof, and are interconnected by means of an infusible stitching;
   b. pre-growing a plurality of plants in the holes of the hydroponic substrate;
   c. assembling the plant growth and support modules into a green wall by fixing the backing of said plant growth and support modules to a wall surface.

19. The method according to claim 18, wherein said plant growth and support modules are modules according to claim 1.

\* \* \* \* \*